US012486060B2

(12) United States Patent
Hellenbrand

(10) Patent No.: US 12,486,060 B2
(45) Date of Patent: *Dec. 2, 2025

(54) FILLING STATION AND METHOD FOR FILLING A TRANSPORT TRAY

(71) Applicant: CareFusion Germany 326 GmbH, Kelberg (DE)

(72) Inventor: Christoph Hellenbrand, Kaifenheim (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,698

(22) Filed: May 31, 2024

(65) Prior Publication Data

US 2024/0317437 A1 Sep. 26, 2024

Related U.S. Application Data

(63) Continuation of application No. 17/978,626, filed on Nov. 1, 2022, now Pat. No. 12,030,683, which is a (Continued)

(51) Int. Cl.

| | |
|---|---|
| ***B65B 35/30*** | (2006.01) |
| ***B65B 5/10*** | (2006.01) |
| ***G07F 17/00*** | (2006.01) |

(52) U.S. Cl.

CPC .............. *B65B 35/30* (2013.01); *B65B 5/103* (2013.01); *G07F 17/00* (2013.01); *G07F 17/0092* (2013.01); *B65B 2210/04* (2013.01)

(58) Field of Classification Search

CPC ...... B65B 35/30; B65B 5/103; B65B 2210/04

See application file for complete search history.

(56) References Cited

U.S. PATENT DOCUMENTS 6,115,990 A * 9/2000 Vogelsanger ............. B65B 5/12 53/53
7,233,682 B2 * 6/2007 Levine ................... G06Q 10/08 382/101

(Continued)

FOREIGN PATENT DOCUMENTS

CN 101596147 A 12/2009
CN 103995949 A 8/2014

(Continued)

OTHER PUBLICATIONS

Brazil Office Action for Application No. BR112018013696-4, dated May 27, 2020, 5 pages including partial machine translation.

(Continued)

*Primary Examiner* — Gloria R Weeks
(74) *Attorney, Agent, or Firm* — MASCHOFF BRENNAN

(57) ABSTRACT

Filling stations are provided that include a transfer tray having filling receptacles and a closing device arranged under the filling receptacles to open and close bottom openings in the filling receptacles, an optical detection device to generate images of filling receptacles having drug portions arranged therein, and a control device coupled to the optical detection device. The control device causes displaying of a filling template of which filling receptacles are to be filled with one or more drug portions, comparing an actual filling of the filling receptacles based on the one or more images of the filling receptacles generated by the optical detection device to a target filling, determining that no deviation exists between the actual filling and the target filling, and opening the closing device for transferring the drug portions from the transfer tray to a transport tray. Systems and methods for filling a transfer tray are also provided.

20 Claims, 7 Drawing Sheets

Related U.S. Application Data continuation of application No. 17/151,019, filed on Jan. 15, 2021, now Pat. No. 11,524,804, which is a continuation of application No. 16/381,987, filed on Apr. 11, 2019, now Pat. No. 10,934,037, which is a continuation of application No. 15/010,210, filed on Jan. 29, 2016, now Pat. No. 10,293,963.

(56) References Cited

U.S. PATENT DOCUMENTS

| | | | | |
|---|---|---|---|---|
| 7,690,173 | B2 * | 4/2010 | Luciano, Jr. | B65D 75/5888 53/411 |
| 8,141,330 | B2 * | 3/2012 | Henkel | B65B 5/103 53/500 |
| 8,209,943 | B2 * | 7/2012 | Yuyama | G16H 20/13 53/473 |
| 8,266,878 | B2 * | 9/2012 | Luciano, Jr. | A61J 7/0084 53/473 |
| 8,903,540 | B2 * | 12/2014 | Stork | G05B 19/00 700/214 |
| 8,931,241 | B2 | 1/2015 | Luciano, Jr. | |
| 9,440,758 | B2 | 9/2016 | Duppre | |
| 9,922,419 | B2 | 3/2018 | Takahashi | |
| 10,293,963 | B2 | 5/2019 | Hellenbrand | |
| 10,351,285 | B2 | 7/2019 | Sweet et al. | |
| 10,934,037 | B2 * | 3/2021 | Hellenbrand | G07F 17/0092 |
| 11,524,804 | B2 | 12/2022 | Hellenbrand | |
| 2005/0146708 | A1 | 7/2005 | Shi et al. | |
| 2005/0226488 | A1 * | 10/2005 | Barry | G01N 21/9054 382/141 |
| 2008/0093372 | A1 * | 4/2008 | Milton | B65B 57/14 221/13 |
| 2010/0236960 | A1 * | 9/2010 | Niven | A61J 7/0069 206/459.1 |
| 2013/0218330 | A1 * | 8/2013 | Chudy | G07F 17/0092 700/244 |
| 2014/0360141 | A1 * | 12/2014 | Willard, III | B65B 65/00 53/507 |
| 2015/0210410 | A1 * | 7/2015 | Umeno | A61J 1/2096 53/51 |
| 2015/0213230 | A1 | 7/2015 | Chudy et al. | |
| 2015/0266604 | A1 * | 9/2015 | Amano | B65H 16/04 242/534 |
| 2016/0027163 | A1 * | 1/2016 | Bear | G06T 7/001 53/247 |

FOREIGN PATENT DOCUMENTS

| | | | |
|---|---|---|---|
| DE | 102011086575 | A1 | 5/2013 |
| JP | H11309198 | A | 11/1999 |
| JP | 2006162174 | A | 6/2006 |
| JP | 2009096557 | A | 5/2009 |
| JP | 2013116743 | A | 6/2013 |
| WO | WO-2013009852 | A1 | 1/2013 |
| WO | WO-2013034504 | A1 | 3/2013 |
| WO | WO-2013115093 | A1 | 8/2013 |
| WO | WO-2015191704 | A1 | 12/2015 |

OTHER PUBLICATIONS

Canadian First Office Action for Application No. 3,012,893, dated Nov. 10, 2022, 4 pages.

Canadian Second Office Action for Application No. 3,012,893, dated Jun. 13, 2023, 4 pages.

Extended European Search Report for Application No. 16153272.6, dated Jul. 26, 2016, 6 pages including partial machine translation.

Indian Office Action for Application No. 201827028125, dated Sep. 2, 2020, 7 pages.

International Search Report and Written Opinion for Application No. PCT/EP2016/080673, dated Feb. 6, 2017, 15 pages including English translation.

Japanese Decision of Refusal for Application No. 2018-538848, dated Feb. 22, 2022, 6 pages including translation.

Japanese First Office Action for Application No. 2018-538848, dated Nov. 11, 2020, 8 pages including translation.

Japanese Second Office Action for Application No. 2018-538848, dated Jul. 13, 2021, 8 pages including translation.

Korean Notice of Final Rejection for Application No. 10-2018-7021603, dated Jul. 28, 2023, 7 pages including translation.

Korean Request for the Submission of an Opinion for Application No. 10-2018-7021603, dated Jan. 30, 2023, 14 pages including translation.

United Arab Emirates First Office Action for Application No. P6000984/2018, first received Jun. 15, 2022, 10 pages.

United Arab Emirates Second Office Action for Application No. P6000984/2018, first received Oct. 5, 2023, 5 pages.

United Arab Emirates Office Action for Application No. P600084/2018, dated Dec. 31, 2024, 5 pages.

* cited by examiner

FILLING STATION AND METHOD FOR FILLING A TRANSPORT TRAY

CROSS-REFERENCE TO RELATED APPLICATIONS

This application is a continuation of U.S. patent application Ser. No. 17/978,626, filed on Nov. 1, 2022, entitled "FILLING STATION AND METHOD FOR FILLING A TRANSPORT TRAY," now U.S. Pat. No. 12,030,683, issued Jul. 9, 2024, which is a continuation of U.S. patent application Ser. No. 17/151,019, filed on Jan. 15, 2021, entitled "FILLING STATION AND METHOD FOR FILLING A TRANSPORT TRAY," now U.S. Pat. No. 11,524,804, issued Dec. 13, 2022, which is a continuation of U.S. patent application Ser. No. 16/381,987, filed on Apr. 11, 2019, entitled "FILLING STATION AND METHOD FOR FILLING A TRANSPORT TRAY," now U.S. Pat. No. 10,934,037, issued Mar. 2, 2021, which is a continuation of U.S. patent application Ser. No. 15/010,210, filed on Jan. 29, 2016, entitled "FILLING STATION AND METHOD FOR FILLING A TRANSPORT TRAY," now U.S. Pat. No. 10,293,963, issued May 21, 2019, the disclosures of which are incorporated herein in their entirety for all purposes.

BACKGROUND

The present disclosure relates to a method for filling a transport tray for transferring drug portions to a machine tray of an automatic dispensing station and to a filling station for such a transport tray.

Depending on their expansion stage, modern automatic blister packaging machines, as are disclosed for instance in WO 2013/034504 A1, include several hundred supply and dispensing stations. Multiple drug portions of specific types of drugs are stored in each of these, and individual drug portions may be dispensed on demand. The automatic blister packaging machines combine and blister-package the drug portions stored in the supply and dispensing stations in accordance with the medically prescribed input items.

In many medical treatment settings, it is desirable to provide a method for filling a transport tray to reduce the risk of incorrectly filling receptacles in the transport tray, and to provide an appropriate filling station for a transport tray.

SUMMARY

One or more disclosed embodiments provide a filling station including a transfer tray having a plurality of filling receptacles and a closing device arranged under the filling receptacles, the closing device configured to open and close bottom openings in the filling receptacles, an optical detection device configured to generate one or more images of filling receptacles having drug portions arranged therein, and a control device coupled to the optical detection device. The control device is configured to cause display of a filling template of which filling receptacles are to be filled with one or more drug portions, compare an actual filling of the filling receptacles based on the one or more images of the filling receptacles generated by the optical detection device to a target filling, determine that no deviation exists between the actual filling and the target filling, and open the closing device for transferring the drug portions from the transfer tray to a transport tray.

One or more disclosed embodiments provide a system including a transfer tray, a transport tray, a control device, and an optical detection device. The system is configured to generate a filling template based on a target filling of filling receptacles in the transfer tray, the filling template indicating which of the filling receptacles are to be filled with one or more drug portions, generate, via the optical detection device, images of the filling receptacles, wherein an image of a filling receptacle shows drug portions arranged therein, determine an actual filling of the filling receptacles based on the images, identify a level of deviation between the actual filling of the filling receptacles and the one or more target fillings, and open a closing device of the transfer tray to transfer the drug portions to the transport tray based on the level of deviation.

One or more disclosed embodiments provide a method that includes generating, by a control device, a filling template based on a target filling of filling receptacles in a transfer tray, the filling template indicating which of the filling receptacles are to be filled with one or more drug portions, generating, by an optical detection device, images of the filling receptacles, wherein an image of a filling receptacle shows drug portions arranged therein, determining, by the control device, an actual filling of the filling receptacles based on the images, identifying, by the control device, a level of deviation between the actual filling of the filling receptacles and the one or more target fillings and opening a closing device of the transfer tray to transfer the drug portions to a transport tray based on the level of deviation.

BRIEF DESCRIPTION OF THE DRAWINGS

The systems, devices and methods according to the present disclosure are described in greater detail below, with reference to the appended drawings, wherein.

DETAILED DESCRIPTION

Figure 1A:
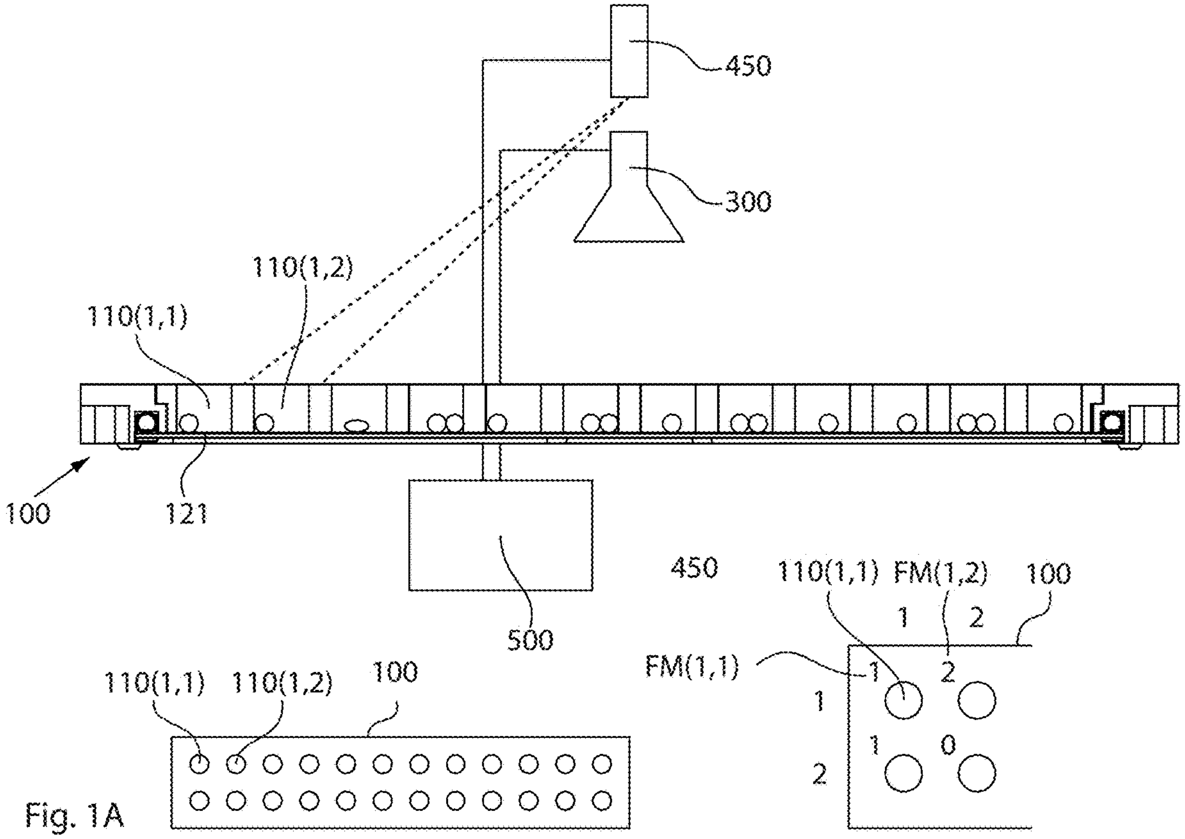
FIGS. 1A and 1B illustrate stages of a method using an embodiment of a filling station.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Due to the typical design of supply and dispensing stations, generally the only types of drugs stored in them are drugs that are requested relatively frequently and/or that have a lengthy expiration date. In other words, the supply and dispensing stations used in large numbers are not suitable for the types of drugs (e.g., auxiliary drugs) that are requested only very infrequently, that have a very short expiration period or shelf-life, or that, due to their physical or galenic properties, cannot or should not be separated in the supply and dispensing stations.

For typical automatic blister packaging machines, these auxiliary drugs are fed into the blister packaging process via an alternative automatic dispensing station (e.g., auxiliary dispensing drawer). These alternative automatic dispensing stations may be embodied, for instance, as fixed mounted drawer systems that have a pull-out machine tray for temporarily storing drug portions of the aforesaid types of drugs. When extended or pulled out, a mobile transport tray from which drug portions may be transferred to the machine tray of the automatic dispensing station may be placed onto the machine tray. To this end, both the machine tray and the transport tray have a plurality of receptacles for drug portions, wherein the arrangements of the receptacles of the transport tray and the machine tray match one another, in order to enable smooth transfer of the drug portions. The receptacles in both the machine tray and the transport tray have bottom openings that may be opened and closed with a closing device.

Using the transport tray, it is possible to transfer a plurality of drug portions, or merely one drug portion, per receptacle. Typically, the transport trays are filled manually by a user (e.g., according to an automatically generated filling plan). Depending on the drug combinations to be blister-packaged by the automatic blister packaging machines, it is common for the receptacles in a transport tray to be filled with different types of drugs and/or with a different number of drug portions. This leads to target fillings of the receptacles in the transport tray that may differ from one another (e.g., that in accordance with the target filling, three drug portions of a drug type 1 are to be added to a receptacle 1, and two drug portions of a drug 1 and two drug portions of a drug type 2 are to be added to a receptacle 2). To facilitate correct and error-free blister packaging, it is extremely important that the correct target filling is present in the correct receptacle. Due to the relatively high number of receptacles in a transport tray and to the similar embodiment of all receptacles, incorrect filling can occur relatively rapidly with typical transport trays, which then has to be corrected with a high expenditure of time.

Accordingly, a method for filling a transport tray for transferring drug portions to a machine tray of an automatic dispensing station is provided. The transport tray used in the presently disclosed method includes a plurality of receptacles for drug portions, and a target filling of a plurality of receptacles in the transport tray is transmitted to a control device, wherein the target filling includes at least information about the at least one type of drug to be filled and the number of drug portions per type of drug and receptacle.

Based on the prepared target filling and on a filling regime, at least one filling template is produced (e.g., generated) and displayed on a display assembly. The filling regime determines which criteria are used to produce the filling template, wherein the filling regime itself may be influenced by the composition of the target filling, especially by the number of types of drugs that are to be added in accordance with the target filling. Depending on the filling regime, one filling template or multiple filling templates may be produced and displayed per target filling. Drug portions corresponding to a filling template may be transferred, in accordance with the filling template, to the receptacle of the transport tray that is to be filled. A user may do this manually, or, alternatively, the transfer may also be automated and/or performed using a tool. Depending on the number of filling templates and the filling regime, one or a plurality of transfers may be made. If a user performs the transfer, this is a typical manual filling.

After all of the drug portions have been transferred into the receptacles in the transport tray, i.e. all of the filling templates have been processed, an image of at least the receptacles to be filled in accordance with the target filling is produced using an optical detection device. Using the image, the actual filling, quantity, and quality of the added drug portions are detected, determined, and compared to the target filling. To this end, the image or images are analyzed (e.g., with special image processing software), wherein the target filling of the receptacles and the characteristics of the individual drug portions are used for reference during the analysis. These characteristics are known to the software. Alternatively, the target filling may include them, for instance if a completely new type of drug was added. The target filling then includes not only the provision that receptacle X should contain a number of Y drug portions of a certain new type of drug, but also, for instance, how large and what color the individual drug portions are.

The transport tray may be released if no deviation from the target filling (e.g., target deviation) is found in the comparison of the actual filling of all of the receptacles to be filled.

Thus, with the optical detection device, it may be definitively determined whether the receptacles to be filled in accordance with the target filling are filled with the correct drug portions, wherein quality is taken into account in addition to quantity. Thus the possibility that a transport tray in which not all of the receptacles are correctly filled in accordance with the target filling will be released for further processing is substantially eliminated.

During the transfer of the drug portions to the receptacles it is also possible that one drug portion will inadvertently be added to receptacles that are to remain empty in accordance with the target filling. Thus, the actual filling, not only of the receptacles to be filled in accordance with the target filling, but also of all receptacles in the transport tray, may be determined and compared to the target filling.

As discussed above, the at least one filling template may be produced using a filling regime. If the target filling includes a plurality of types of drugs, it may be advantageous (e.g., make things easier for the user) to prepare multiple filling templates that are processed successively. During simple target fillings, for accelerating processing, a filling template may be prepared that includes all receptacles to be filled and all types of drugs to be filled.

There may be incorrect fillings when the target filling includes a plurality of types of drugs and/or portions. Accordingly, a plurality of filling templates may be produced, wherein each filling template includes receptacles that are all to be filled by only one type of drug. The drug portions in accordance with target filling may be thus filled sequentially by type. In this case, a step indicating the different filling templates successively, and a step of transferring drug portions corresponding to the filling template to the receptacles of the transport tray that are to be filled in accordance with the filling template, are repeated until the target filling of all receptacles to be filled is achieved. Here, a filling template represents a filling step and the subsequent transfer of drug portions represents a transfer step, wherein both steps are repeated until all receptacles have been filled corresponding to target filling, where only one type of drug is filled per filling template. This reduces the probability that errors will occur during combination of the target filling. Thus, it is possible to provide the user only the one type of drug to be filled in accordance with the filling template. Exactly as many drug portions may be prepared as are required to be transferred into the receptacles, so that a user recognizes a potential incorrect filling during the transfer.

Multiple filling templates may be produced, wherein these include all of the drug portions for a receptacle to be filled, and that steps of producing and displaying a filling template, and a step of transferring drug portions corresponding to the filling template to the receptacles of the transport tray that are to be filled in accordance with the filling template, are repeated until the target filling of all of the receptacles to be filled is achieved. The drug portions in accordance with the target filling are thus filled sequentially by receptacle. Thus, instead of one type of drug being filled into multiple receptacles before another type of drug is filled into the receptacles, one receptacle may be completely filled (e.g., with different types of drugs) before moving on to the next. Depending on the type of display of a filling template, only one filling template may be displayed and processed for a receptacle, reducing the probability of an incorrect filling.

In one example, the filling regime may also provide that only a single drug portion is filled in a receptacle per filling template, i.e. that in this case the number of filling templates is equal to the total number of drug portions.

Which filling regime is used, may depend on the exact composition of the target filling. If the transfer is done manually by a user, individual characteristics of the user may also influence the filling regime. For example, through various settings the user may have extensive influence on the production of the filling template(s) or respectively may have influence on according to which filling regime the filling template or the filling templates is/are produced.

Regardless of the filling regime according to which the filling templates are produced, a filling template may be displayed such that a plurality of filling sub-templates are displayed and processed. Thus, a filling template may be divided into a number of sub-templates, wherein the latter may be allocated to different receptacles and/or different types of drugs. The filling sub-templates may be easier to process and the probability of errors during the transfer or filling of the receptacles may be lower.

Drug portions may be transferred into the receptacles in the transport tray. This may be done manually by a user, for example. In a direct transfer of the drug portions to the receptacles in the transport tray, the target filling may be combined directly in these receptacles, specifically according to the filling regime or the filling templates. Especially if the target filling is combined sequentially with respect to the different types of drugs, it may be advantageous to arrange for the transfer to the receptacles in the transport tray while interposing a temporary receptacle. For example, prior to the transfer to the receptacles in the transport tray, in accordance with the filling template the drug portions may be filled in corresponding receptacles in a transfer tray arranged above the transport tray. This transfer tray permits a number of embodiments that reduce the probability of an incorrect filling, make it easier to document the filling process, simplify the display of a filling template, and are more user-friendly. In other words, interposing the transfer tray substantially increases the flexibility of the method.

The actual filling of the receptacles in the transport tray may be checked prior to release, and the release may be affected only if all of the receptacles have been filled corresponding to the target filling. When an error is determined (e.g., target deviation), the actual filling must be checked and the drug portions must be added or corrected as appropriate, wherein the drug portions to be added may be determined when the actual filling is compared to the target filling. This may be time-consuming, in particular in the case of complex target fillings. In addition, this has the drawback that if an incorrect type of drug is in a receptacle, it might be necessary to discard all drug portions in a receptacle (e.g., because of potential allergic reactions).

To make it possible to detect an error as early as possible, an image may be produced, by an optical detection device, of at least the receptacles that are to be filled in accordance with the filling template. The actual filling, quantity, and quality of the added drug portions may be detected, determined, and compared to the appropriate filling template. If no filling deviation is found, the next filling template may be displayed, until the target filling of all receptacles to be filled is achieved.

Thus, not only may the final actual filling be determined and compared to the current filling template, but also temporary actual fillings in accordance with the filling template may be determined and compared to the current filling template. In this way, it is possible to detect an error immediately, and the error is not carried over until the supposed target filling is achieved. This process may be combined particularly effectively with the interposing of the transfer tray, especially if the filling templates are produced as a function of the type of drug. For example, per filling template/filling step, only drug portions of one type of drug are contained in a receptacle of the transfer tray. Thus, it is particularly simple to detect a potential error.

This process may be used with the sequential filling by type without a transfer tray. For determining a filling deviation, with the second and each subsequent type of drug the system may make use of an image of a prior filling and, with the current image, produce a differential image that is then used to determine the actual filling. In addition, the system may process very extensive target fillings in which drug portions may be completely covered by overlaying drug portions.

When it is determined that a transfer tray has been filled incorrectly, the user may be prompted to correct this error, and only thereafter are the drug portions supposed to be transferred to the receptacles in the transport tray. To prevent a transfer from being initiated even when there is an error (e.g., a filling deviation), if no filling deviation is determined, the transfer of the drug portions from the transfer tray to the transport tray may be released, and otherwise the transfer is not released. The release may be made, for instance, using a light signal. The transfer tray may include a closing device that only permits the drug portions to be transferred upon release.

The transfer may occur automatically after the release, to which end the closing device is then appropriately embodied (e.g., it is coupled to an appropriate drive or has such a drive).

The filling template or templates may be displayed on a display assembly. To simplify a possible error correction, when a filling deviation is found, it is displayed by the display assembly.

The filling template or templates may be displayed on a display device (e.g., a monitor) that is arranged, for instance, adjacent to the transport tray. For this, the user must continuously look back and forth between the display device and the transport tray or the transfer tray. Accordingly, at least one display device may be allocated to each receptacle of the transport or transfer tray, the display device displaying the filling template for the corresponding receptacles. For example, a plurality of diodes per receptacle may be provided, or small displays may be built into the trays.

The allocation of display devices reduces the probability of incorrect fillings, but the display devices may increase the costs of the trays. Accordingly, filling templates may be displayed in that filling templates are projected onto the transport tray or transfer tray. This may be done, for instance, with a laser or the like. This manner of displaying the filling template has the advantage that the user does not always have to look back and forth between display device and receptacle, and furthermore there are no costs for additional display devices for the receptacles. Thus, one projector device may be used for all of the transport trays to be filled. In addition, the projector device may easily cooperate with the transfer trays.

For the purposes of documentation, it may be provided that images produced by the optical detection device for determining the actual filling in accordance with filling templates and/or the actual filling in accordance with the target filling may be stored.

An image of at least the receptacles to be filled in accordance with the target filling may be produced after all the drug portions have been distributed to the receptacles. The actual filling of the receptacles may thus not be determined until all of the filling templates that have been produced and displayed based on the filling regime and the target filling have been processed. The result of this is that incorrect filling for a filling template may not be immediately detected, but instead may remain undetected until the supposed completion of the target filling.

When a plurality of filling templates are prepared, it is provided that, after drug portions corresponding to a filling template have been transferred into the receptacles to be filled in accordance with the filling template, an image of at least the receptacles to be filled in accordance with the filling template may be produced by an optical detection device. Using the image, the actual filling may be determined and compared to the filling template, and if no deviation is found, the next filling template may be displayed. However, if a deviation is found, it may be displayed to the user so that it may be corrected early. Once the correction has been made, the filling may be checked against the current filling template again.

When the appropriate filling regime is selected (e.g., one filling template per receptacle or even one filling template per drug portion), it is thus possible to freely select the checking stage. For example, a check after adding all of the drug portions of a target filling, or one check per drug portion. The at least one filling template may be displayed by a display assembly or device. If, based on the filling regime, a plurality of filling templates are prepared, they may be illustrated successively to reduce the workload for the user and to avoid incorrect fillings.

However, in certain cases it may be more pleasant for the user, especially with respect to orientation on the tray, if not every filling template is displayed successively, but instead multiple filling templates are displayed simultaneously (e.g., each for one type of drug during sequential filling by type) and a processed filling template is deleted (e.g., no longer displayed). When one filling template is allocated to each receptacle, the foregoing approach has the effect that the user perceives a large changing filling template that is composed of multiple filling templates.

A filling station may include a transport tray having multiple receptacles that are each for at least one drug portion, wherein each receptacle has a bottom opening. A closing device may be arranged below the receptacles for which the bottom openings of the receptacles may be opened and closed. The filling station may further include a display device to display filling templates, each filling template displaying which of the receptacles are to be filled with which drug portions, an optical detection device with which images of receptacles having drug portions arranged therein may be produced, and a control device coupled to the display device and the optical detection device.

The control device may be configured such that, depending on a pre-specified target filling of the receptacles in the transport tray and depending on a pre-specified filling regime, at least one filling template is produced and transmitted to the display assembly or device. Based on images of the receptacles, the actual filling of the receptacles may be determined and compared to the filling of the receptacles in accordance with the target filling, and a possible target deviation may be found. If no target deviation is found, the transport tray may be released for transferring the drug portions to the machine tray.

The filling station may include a transfer tray that is arranged above the transport tray and that has a plurality of receptacles, wherein the arrangement of the receptacles in the transfer tray corresponds to the arrangement of the receptacles in the transport tray. The transfer tray may include a closing device that is arranged under the receptacles and with which bottom openings in the receptacles may be opened and closed.

To make it easier for a user to read the filling template, and thus to further prevent the probability of incorrect fillings, the display assembly may include multiple display devices allocated to the receptacles. This makes it possible for the filling templates to be displayed directly at the receptacles that are currently being filled. The filling station may include a projector device with which filling templates may be projected onto the transport or transfer tray. Depending on the exact design of the filling station, the display assembly may be embodied as a projector device, or the display assembly may include a projector device.

Figure 1B:
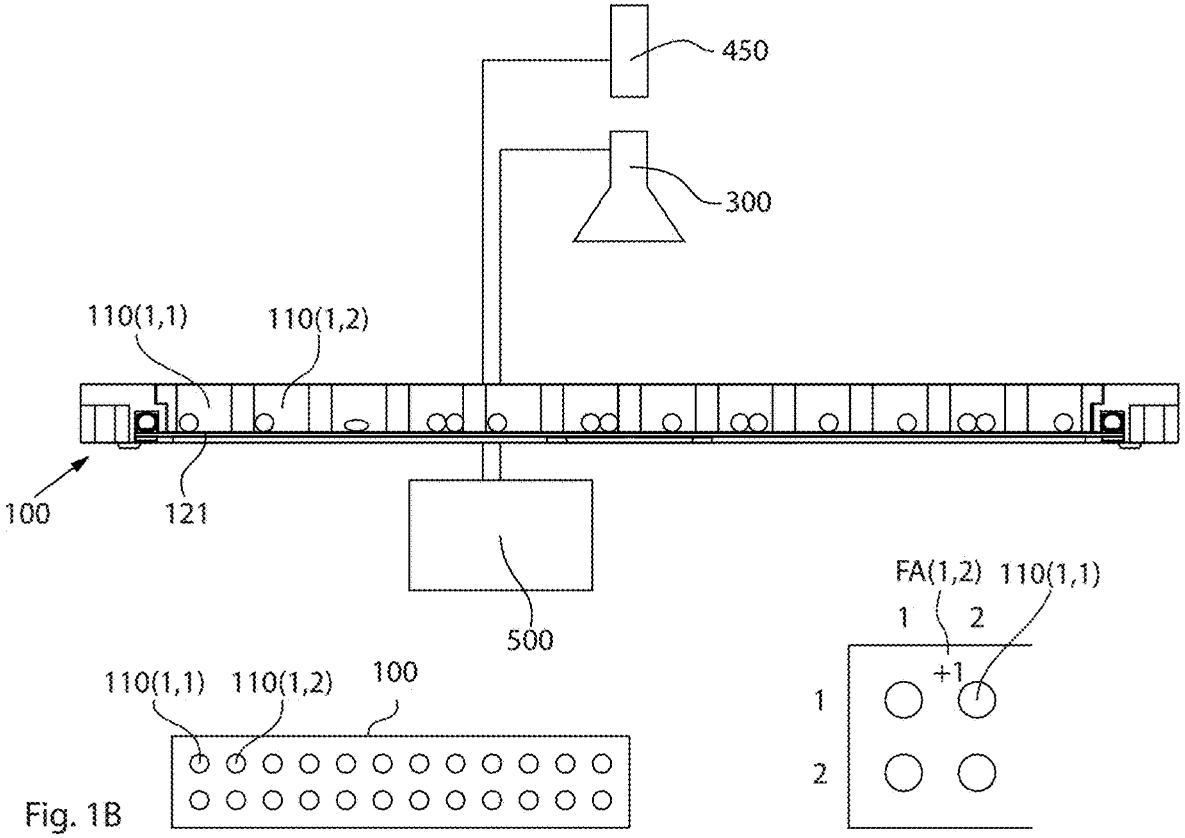

In FIGS. 1A and 1B, the filling station includes a transport tray 100 having a plurality of receptacles 110 whose bottom openings are blocked by a closing plate 121 of a closing device. The closing device will be described in greater detail in the context of subsequent figures. The filling station includes an optical detection device 300 arranged above the transport tray 100 and a projector device 450, wherein both aforesaid devices are coupled to a control device 500.

In FIG. 1A, a schematic top view of the transport tray 100 is provided in the lower left and an enlarged illustration of part of this transport tray 100 is provided in the lower right. In the example illustrated by FIG. 1A, the transport tray 100 has receptacles 110 that are divided into 12 columns and two rows. The transport tray 100 may have any suitable number of columns and rows of receptacles 110. The individual receptacles 110 are numbered in the enlargement, wherein the top left receptacle 100 has the number (1,1). It may furthermore be seen in the enlargement that a filling template FM is projected onto the transport tray 100, wherein one segment FM(1,1), FM(1,2), etc. of the filling template is allocated to each receptacle 110. Depending on how the projector device 450 functions, and depending on the exact manner the method is conducted, the segments of the filling template FM may all be displayed simultaneously or successively as partial filling templates.

The illustrated target filling includes one drug type and therefore only one filling template was produced. The segments of the filling template FM(1,1), FM(1,2) etc. allocated to the receptacles 110 may be displayed successively with a laser, but for ease of understanding are shown simultaneously in the enlargement.

In the illustration in accordance with FIG. 1A, the transfer is completed in accordance with the first (and only) filling template FM, i.e., all receptacles 110 to be filled in accordance with the target filling have been filled. For example, the user may accomplish this manually. As may be seen in comparing the segment FM(1,2) of the filling template FM to receptacle 110(1,2), this receptacle 110(1,2) has only one drug portion, although the target filling provided for two drug portions.

An image of at least the receptacles 110 to be filled, or one image per receptacle 110, may be produced with the optical detection device 300 (e.g. digital camera). Based on this image and the information available about the drug portions, the actual filling of at least receptacles 110 to be filled in accordance with the target filling is determined and compared to the target filling.

In this example, there is a target deviation FA(1,2) for receptacle 110(1,2), since only one drug portion of two provided is in the receptacle 110(1,2). This target deviation FA(1,2) is indicated for the receptacle 110(1,2) by projecting "+1" (see FIG. 1B). Thus, the transport tray 100 has not been released due to the target deviation FA(1,2). Instead, the release occurs when there is no longer a target deviation.

Figure 2A:
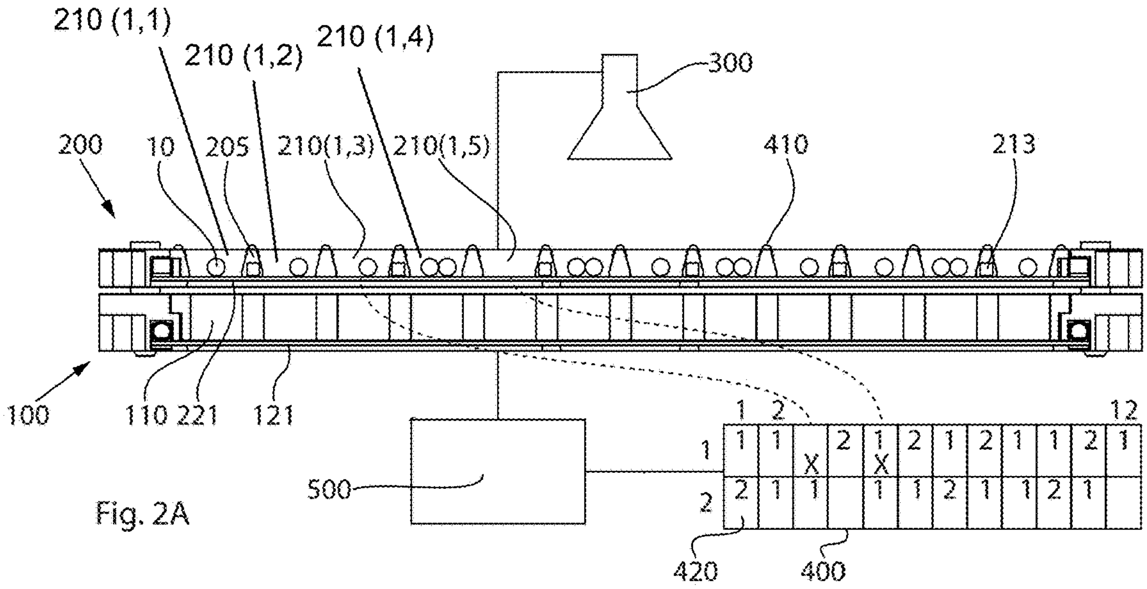
FIGS. 2A-2C illustrate stages of a method using an embodiment of a filling station.
Figure 2B:
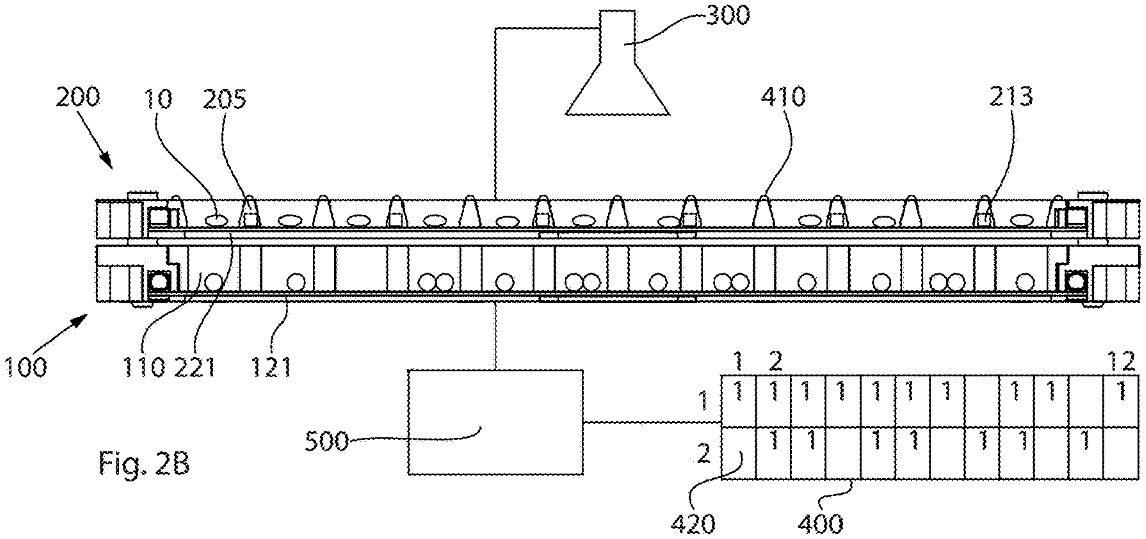
Figure 2C:
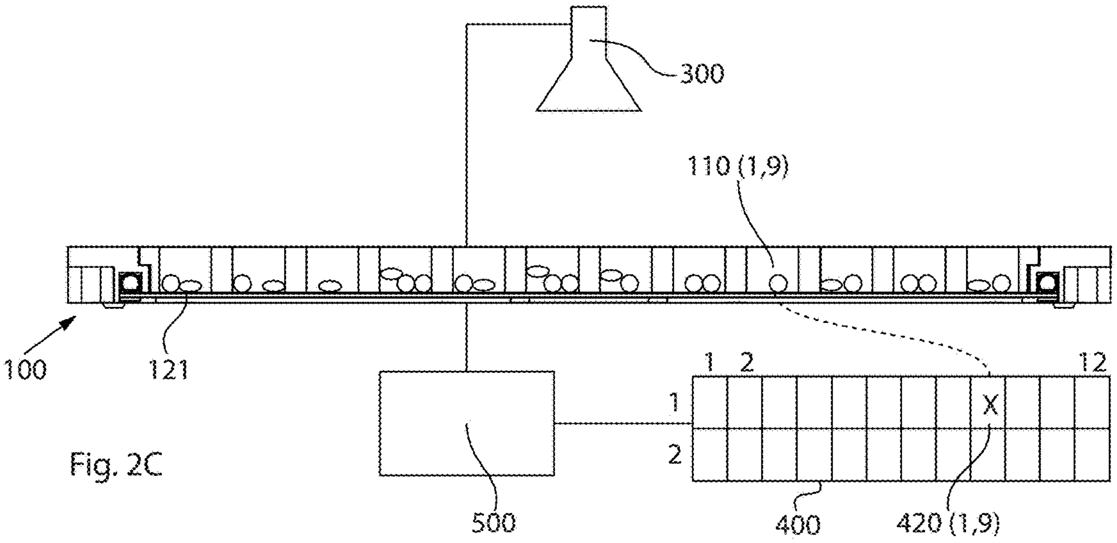

In FIGS. 2A-2C, the filling station includes a transfer tray 200 having a plurality of receptacles 210 that are arranged in a matrix pattern in a receptacle area (see FIG. 3A), wherein each of these receptacles 210 has a bottom opening that is closed by a closing plate 221 of a closing device in FIGS. 2A-2C. The closing device shall be described in greater detail while referencing the following figures.

The filling station furthermore includes a display assembly 400 with which filling templates may be displayed, each of which indicates to the user which of the receptacles 210 is to be filled with how many drug portions 10. In FIG. 2A, the display assembly 400 has 24 different cells 420 that correspond to 24 receptacles 210 of the transfer tray 200, for example. Other numbers of cells 420 corresponding to receptacles 210 may be used. Here, the 24 receptacles 210 are divided into 12 columns and two rows.

The target filling may include two drug types that are filled sequentially by type, i.e. the filling regime specifies that two filling templates are produced and displayed (e.g., one filling template per drug type). The filling template is displayed in its entirety on the display assembly 400 due to the design of the latter.

In FIG. 2A, the display assembly 400 displays a first filling template that displays to a user of the filling station how many drug portions 10 per receptacle are to be added in a first filling step, wherein the number of the drug portions 10 to be added is provided by a numeral in the top half of a cell 420 of the display assembly 400. As illustrated, the filling template receptacles 210(1,1) and 210(1,2) are each to be filled with one drug portion 10, receptacle 210(1,3) is to be filled with zero drug portions 10, receptacle 210(1,4) is to be filled with two drug portions 10, etc.

As illustrated, it is not the transport tray 100 that is directly filled with drug portions 10, but instead a transfer tray 200 arranged above the transport tray 100, and the transfer tray 200 transfers the drug portions 10 per filling template to the receptacles 110 of the transport tray 100.

As may be seen in FIG. 2A, the transport tray 100 also has a number of receptacles 110, wherein the arrangement of the receptacles 110 matches the arrangement of the receptacles 210 in the transfer tray 200. The receptacles 110 of the transport tray 100 are closed with a closing plate 121 of a closing device that is described in greater detail referring to subsequent figures.

In the stage illustrated in FIG. 2A, the first filling template has already been processed. As may be seen by comparing the receptacles 210(1,3) and 210(1,5) of the transfer tray 200 with the corresponding cells of the display assembly 400, the number of drug portions 10 arranged in the receptacles 210(1,3) and 210(1,5) does not equal the number that are indicated in accordance with the filling template via the display assembly 400. According to filling templates, zero drug portions 10 are supposed to be arranged in receptacle 210(1,3) and one drug portion 10 is supposed to be arranged in receptacle 210(1,5). As illustrated, this is not the case as one drug portion 10 is arranged in receptacle 210(1,3) and zero drug portions 10 are arranged in receptacle 210(1,5).

Thus, the filling deviation may be determined in that the optical detection device 300 produces an image of the receptacles 210, or one image per receptacle 210. The number of drug portions 10, and thus the actual filling, may be determined based on the image or images, and the information that is known about the drug type being added to the receptacle 210. Here, it may only be necessary to determine the number, since per filling template only one drug type is added. However, the system may also determine the type and quantity of drug portions 10 added.

The filling station may also include one or more sensors 213 that are allocated to the receptacles 210, and with which the number of drug portions 10 per receptacle 210 may be determined. Determining the number by the sensor 213 may eliminate the need for complex image processing.

A potential filling deviation may be found using the determined actual filling and the filling template. If such a filling deviation is found, transfer of the drug portions 10 into the receptacles 210 in the transport tray 100 is not released. Thus, the drug portions 10 are not transferred until it has been established that there is no filling deviation.

In accordance with FIG. 2A, there is a filling deviation in the receptacles 210(1,3) and 210(1,5), which is clearly indicated on the display assembly 400, prompting the user to correct the filling of the two receptacles 210 that have been incorrectly filled.

As illustrated in FIGS. 2A-2C, two drug types are to be filled in accordance with the target filling, so that after the first drug type is moved into the transport tray 100 another filling template is displayed (see FIG. 2B). As may be seen from the filling template in accordance with row 1 of the display assembly 400 and from the filled receptacles 210, the filling of row 1 of the receptacles 210 is consistent with the filling template, and the drug portions 10 that have been added to the receptacles 210 may be transferred to the transport tray 100.

FIG. 2C illustrates a stage in which the transfer tray 200 was removed from the transport tray 100 to determine the actual filling of the receptacles 110 of the transport tray 100. If each filling template was correctly transferred, the target filling of all of the receptacles 110 in the transport tray should be error-free. An intermediate check of the individual filling templates may be provided. However, the final check of the receptacles 110 in the transport tray 100 may not be regularly omitted in some examples.

Even if all of the filling templates were correctly filled, it may happen that during a transfer a drug portion 10 falls out of the receptacles 210 or remains stuck to the wall of the receptacles 210, such as due to the movement of a closing plate 221 under the bottom openings of the receptacles 210. Despite correct filling of the receptacles 210 in accordance with the filling templates, this may lead to the target filling of the receptacles 110 in the transport tray 100 not being correct for all receptacles 110.

Accordingly, this may be checked in that one or more images (e.g., one image per receptacle) may be made with the optical detection device of at least the receptacles 110 to be filled in accordance with the target filling, and the images may be subjected to image processing that, based on the information on the drug types to be filled, supplies the drug portions 10 per drug type. With the image processing it may also be provided that the detection of foreign matter such as remains of blister packages causes that the receptacle or the filling is marked as erroneous and a user is prompted to correct this (e.g., remove the foreign matter). Release then only follows after correction.

As seen in FIG. 2C, the filling of the receptacle 110(1,9) is not correct, although the two prior checks of the specific filling template indicated correct filling of the transfer tray 200. If incorrect filling of a receptacle 110 is determined, this is indicated on the display assembly 400 at cell 420(1,9) and the transport tray 100 is not released yet.

The filling template and any potential filling deviation or target deviation may be displayed on a display assembly 400 having a single display device 410. Alternatively, the display assembly 400 may include a plurality of display devices 410, wherein a display device 410 may be allocated to each receptacle 110 and/or receptacle 210. The number of drug portions 10 to be added may be displayed directly at the receptacle 110, 210 with these display devices 410. For example, this may prevent transfer errors from a display device 410 arranged at a distance. The display device 410 may be embodied, for instance, as a digital display. If only one drug portion 10 per filling step is added, the display device 410 may also merely indicate the receptacle 110, 210 to which a drug portion 10 is to be added. These display devices 410 may also be used to indicate a deviation once the actual filling has been determined.

Figure 3A:
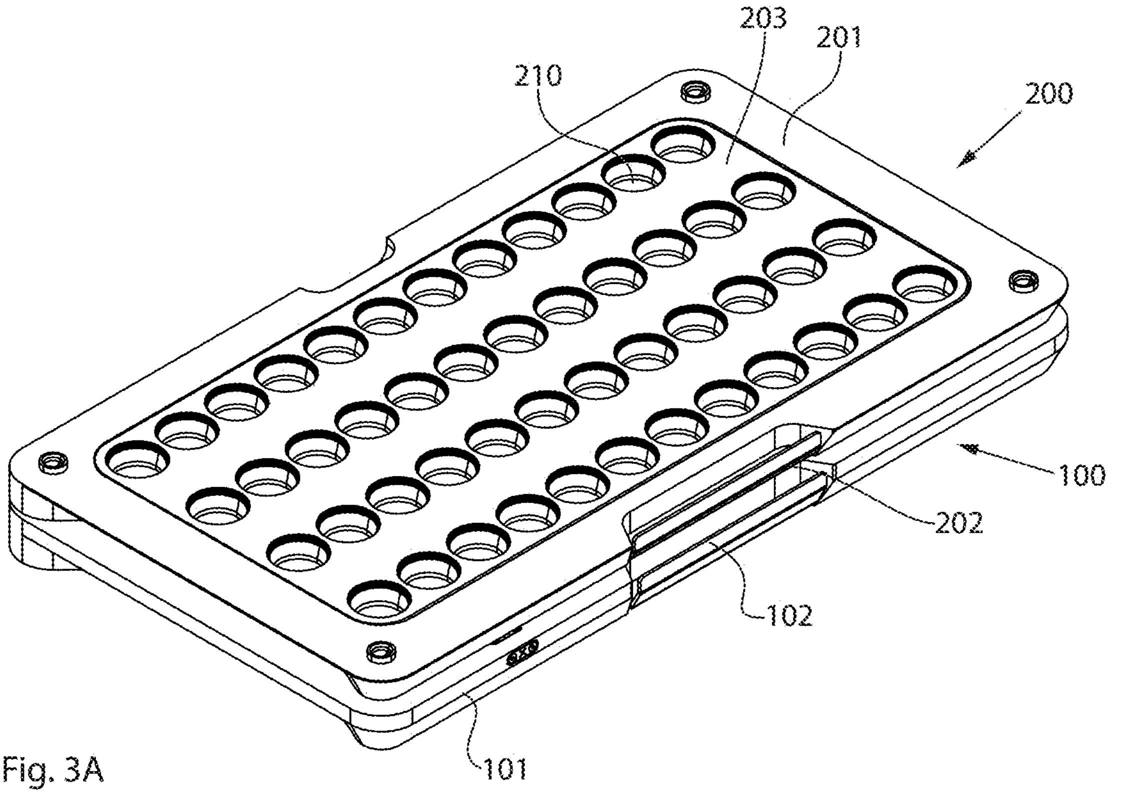
FIG. 3A is a top perspective view of an embodiment of a combination transfer tray/transport tray.
Figure 3B:
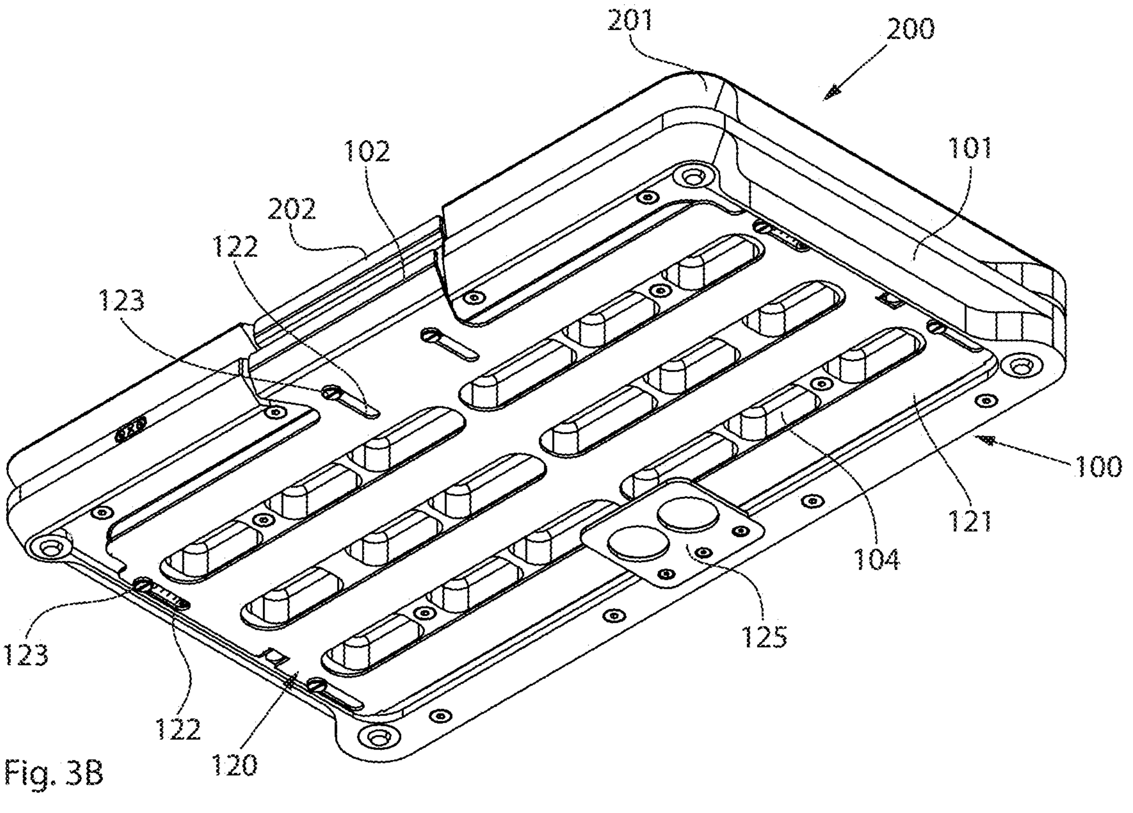
FIG. 3B is a bottom perspective view of the combination transfer tray/transport tray of FIG. 3A.

FIGS. 3A and 3B illustrate a combination of a transfer tray 200 and a transport tray 100, wherein the transfer tray 200 is placed on the transport tray 100. This arrangement may result from the function of the two trays 100, 200.

As seen in FIG. 3A, the transfer tray 200 arranged on top includes a frame 201 in which a receptacle plate 203 is disposed, the receptacle plate 203 having multiple receptacles 210 for accommodating one or more drug portions 10. As may be seen from FIG. 3A, the receptacles 210 may be divided into four rows and twelve columns, though other numbers of rows and columns may be used. The front end face of the transfer tray 200 includes a handle 202 with which a closing device 220 (see FIG. 4C) of the transfer tray 200 may be operated. Arranged below the transfer tray 200 is the transport tray 100, which also has a frame 101 and a handle 102.

FIG. 3B illustrates a view of the combination from below, and thus a view of the bottom area of the transport tray 100. Closing device 120 of the transport tray 100 has bottom openings 111 (see FIG. 5C) of the receptacles 110 in the transport tray 100 may be opened and closed. In addition, the closing device 120 includes a closing plate 121 that is retained on the frame 101 of the transport tray 100 via guides 122 and retaining members 123. The closing plate 121 includes multiple openings 124 (see FIG. 5C) for opening the bottom openings 111. A receptacle plate 103 (see FIG. 5A) of the transport tray 100 includes multiple cut-outs 104 that may be arranged for reducing weight between the rows of receptacles 110. Furthermore, attached to the frame 101 may be an additional retaining unit 125 that supports the center area of the closing plate 121.

Figure 4B:
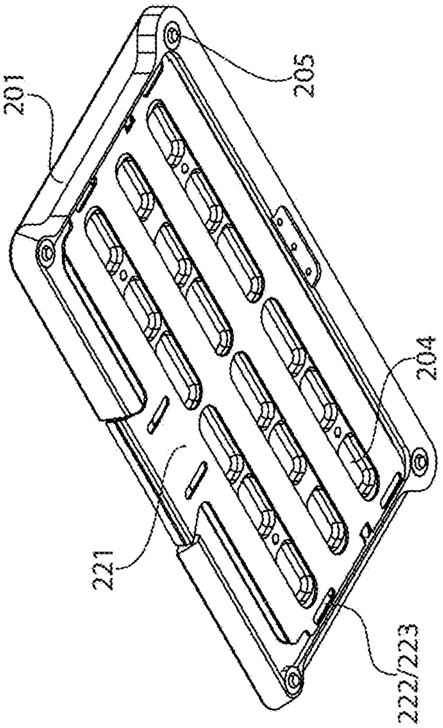
FIG. 4B is a bottom perspective view of a portion of the combination transfer tray/transport tray of FIG. 3A.
Figure 4D:
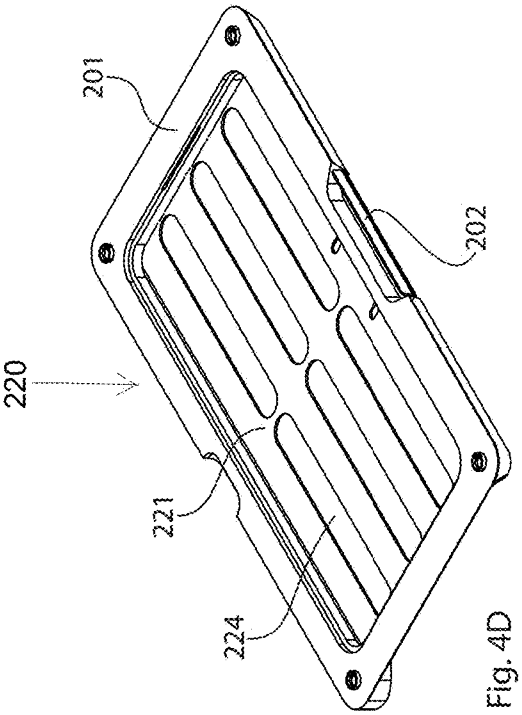
FIG. 4D is a top perspective view of a portion of the combination transfer tray/transport tray of FIG. 4B.
Figure 4A:
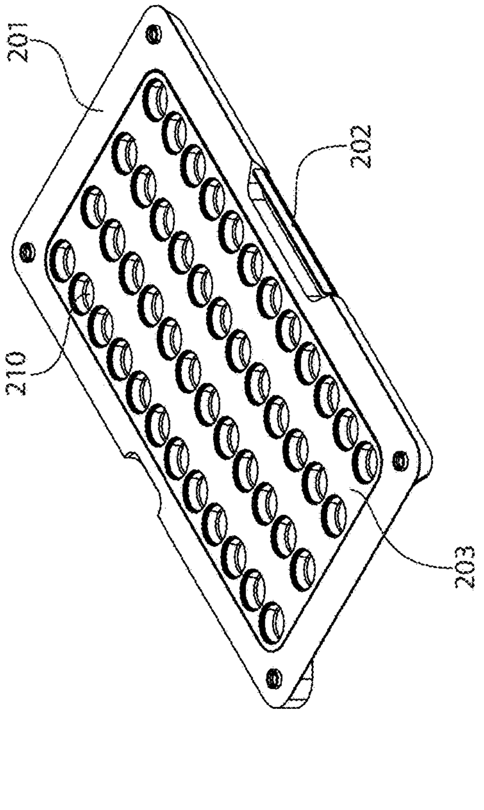
FIG. 4A is a top perspective view of a portion of the combination transfer tray/transport tray of FIG. 3A.
Figure 4C:
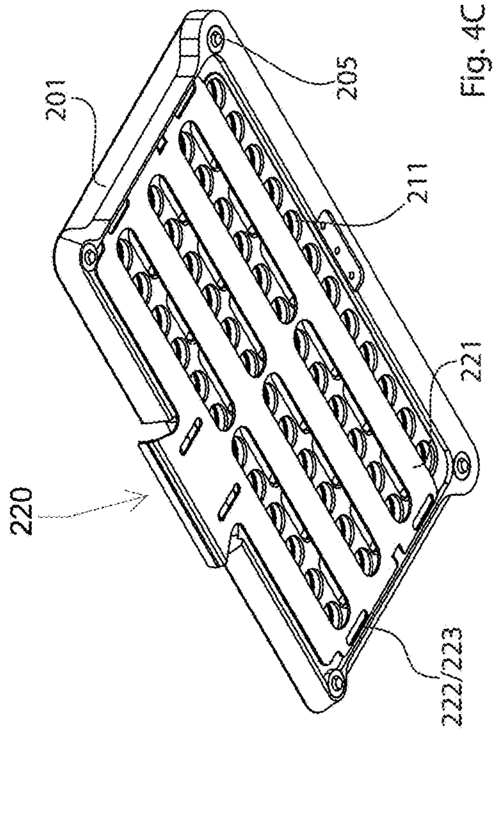
FIG. 4C is a bottom perspective view of the portion of the combination transfer tray/transport tray of FIG. 4A.

FIGS. 4A-4D illustrate various perspective elevations of the transfer tray 200, wherein FIG. 4A is a perspective elevation from above. In FIG. 4B the receptacles 210 are closed and in FIG. 4C the receptacles 210 are almost completely open. As may further be seen from FIGS. 4A and 4B, the receptacle plate 203 of the transfer tray 200 also has cut-outs 204 for reducing weight. As is also the case with the transport tray 100, the closing plate 221 of the closing device 220 is retained on the frame 201 with guides/retaining units 222, 223. The frame 201 furthermore includes projections 205 with which the transfer tray 200 may be oriented on the transport tray 100. FIG. 4D illustrates the transfer tray 200 without receptacle plate 203 and provides a top view of the closing plate 221, which includes multiple openings 224. The closing device 220 may be actuated manually via the handle 202. The receptacle plate 203 may be removable from the frame 201 to simplify cleaning of the receptacles 210 and closing plate 221.

Figure 5A:
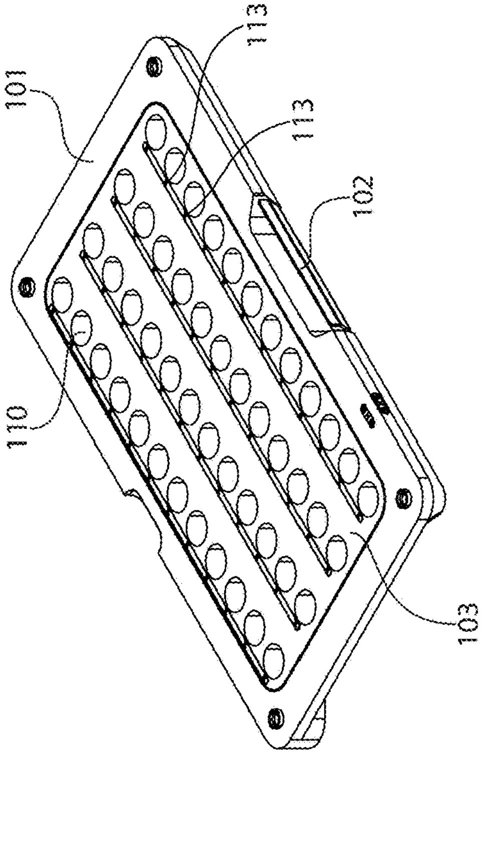
FIG. 5A is a top perspective view of a portion of an embodiment of a combination transfer tray/transport tray.
Figure 5B:
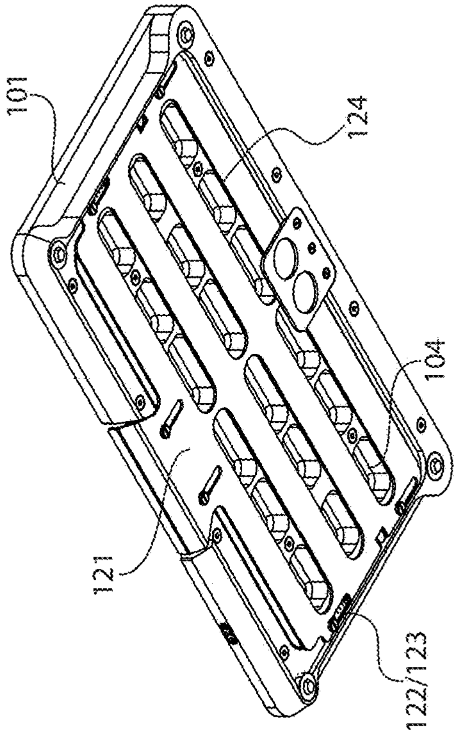
FIG. 5B is a bottom perspective view of a portion of an embodiment of a combination transfer tray/transport tray.
Figure 5C:
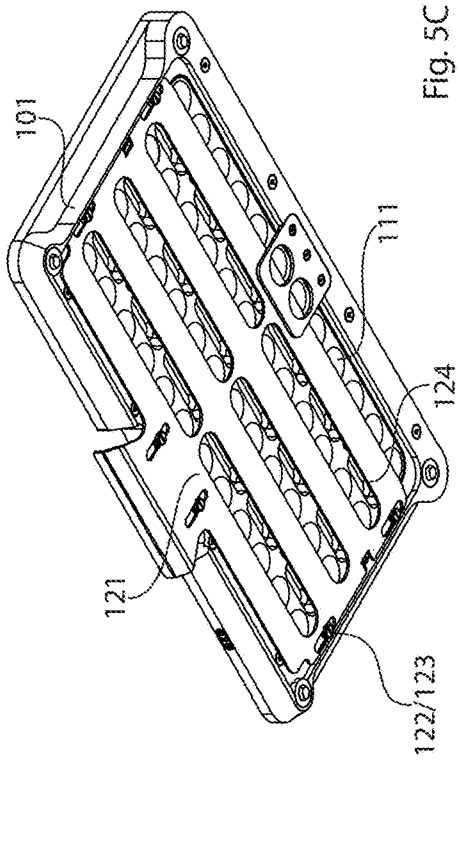
FIG. 5C is a bottom perspective view of the portion of the combination transfer tray/transport tray of FIG. 5A.
Figure 5D:
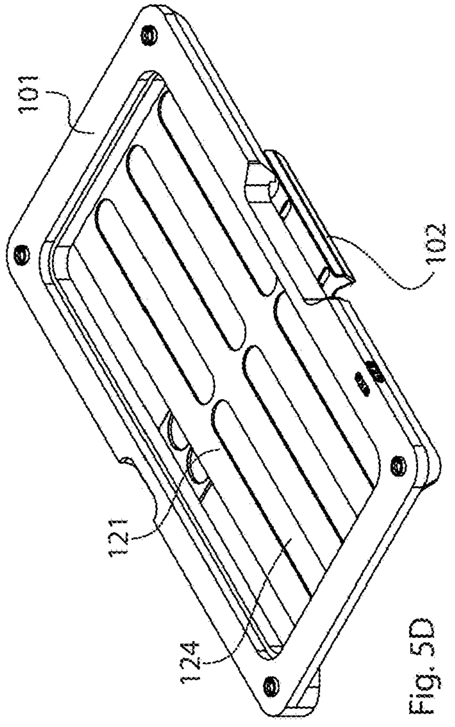
FIG. 5D is a top perspective view of the portion of the combination transfer tray/transport tray of FIG. 5B.

FIGS. 5A-5D illustrate different views of the transport tray 100. In FIG. 5A, multiple display members 113 may be seen that can display correct or incorrect filling of the receptacles 110 of the transport tray 100. Otherwise, the transport tray 100 is largely the same as that of the transfer tray 200, so that reference is made here to the foregoing description.

Figure 6B:
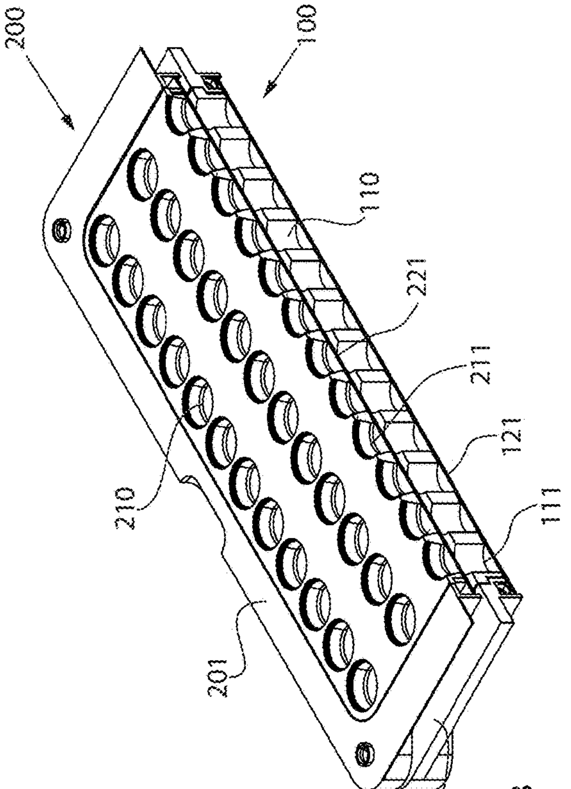
FIGS. 6A-6C are top perspective views of various sections through the combination transfer tray/transport tray of FIG. 3A; and, FIG. 7A is a top plan view of an embodiment of a combination transfer tray/transport tray.
Figure 6C:
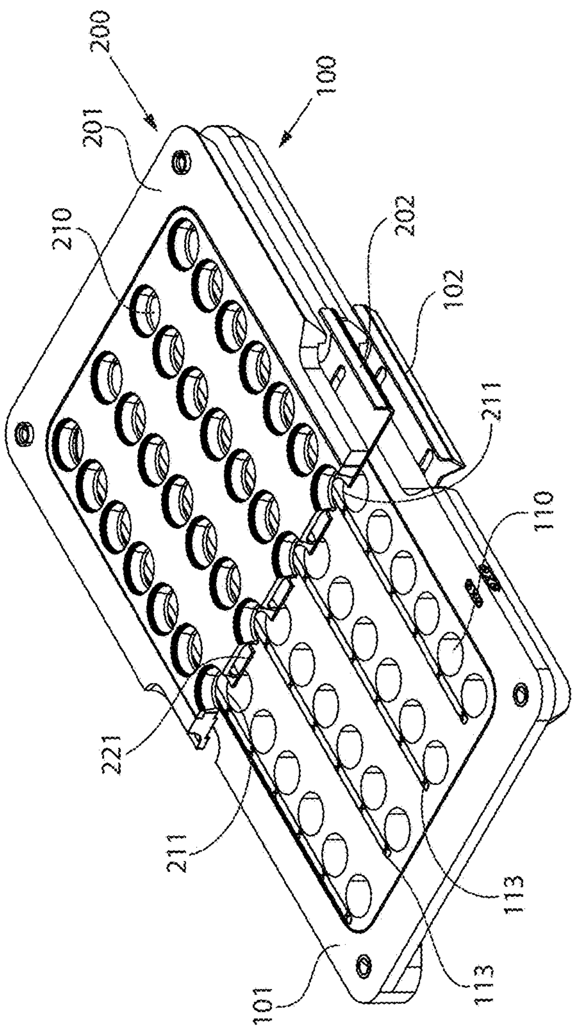
Figure 6A:
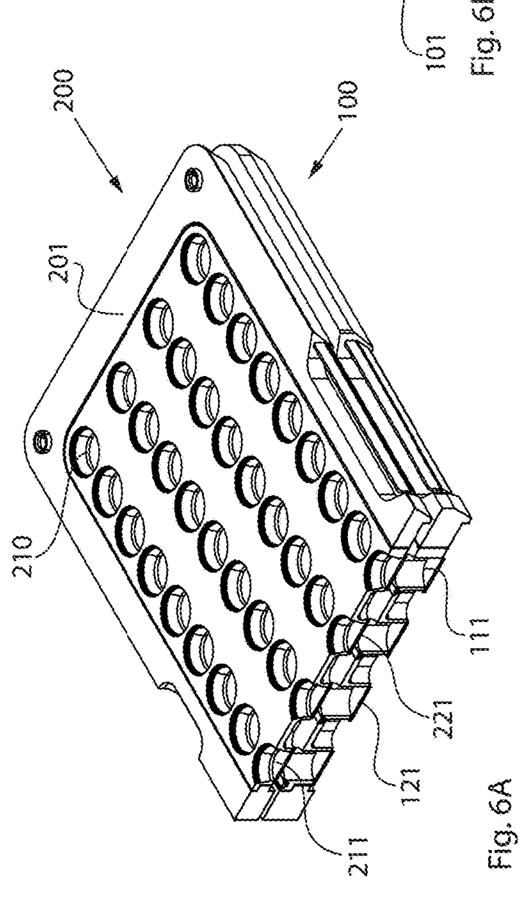

FIGS. 6A-6C illustrate different sections through a combination of a transfer tray 200 and a transport tray 100. In FIGS. 6A and 6B, the bottom openings 111, 211 of the receptacles 110, 210 are closed using the closing plates 121, 221. Furthermore, it may be seen from FIGS. 6A and 6B that the receptacles 210 and the receptacles 110 are oriented relative to one another such that the simplest possible transfer can occur. It may also be seen in FIG. 6B that the receptacles 210 have a wall that is slightly tapered. This prevents a shadow from forming on the bottom area of the transfer openings 211 so that determining the actual filling of the receptacles 210 is not made more difficult by a shadow.

FIG. 6C illustrates a position in which, by actuating the handle 202, the closing plate 221 of the closing device 220 for the transfer tray 200 is moved nearly completely into the open position in which drug portions 10 are transferred from the receptacles 210 into the receptacles 110 of the transport tray 100.

Figure 7A:
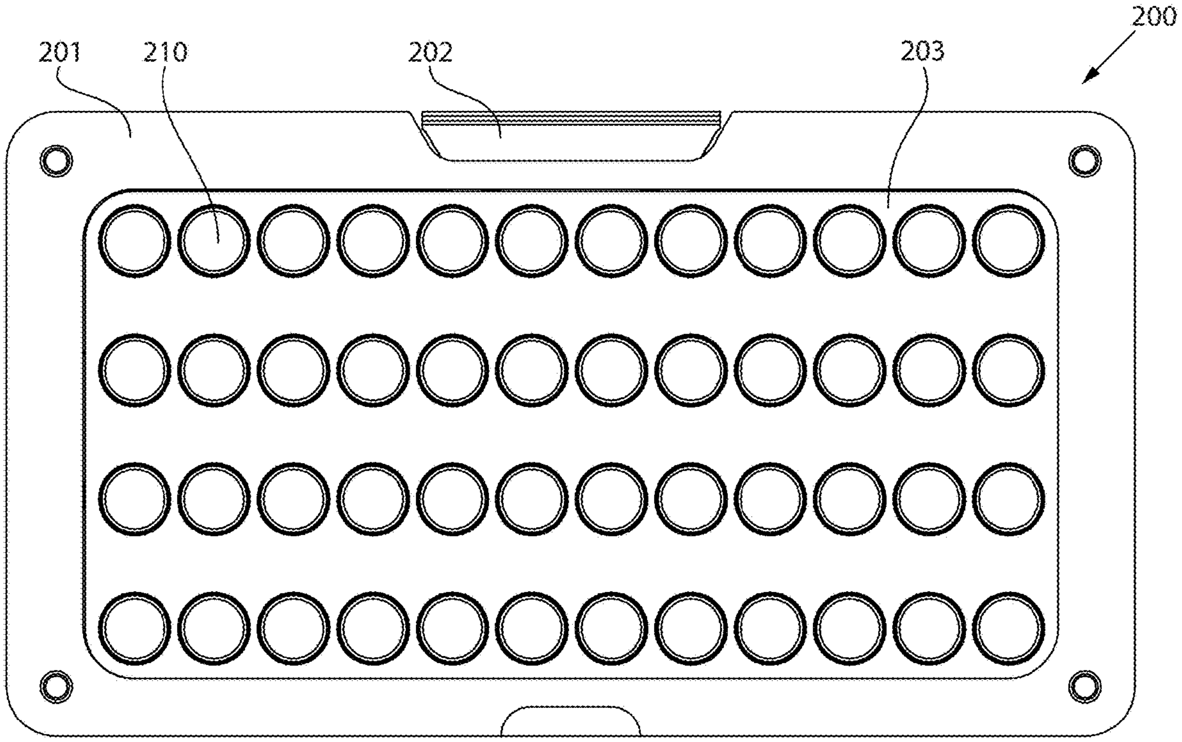
FIG. 7B is a cross-sectional front elevation view of the combination transfer tray/transport tray of FIG. 7A.
FIG. 7C is a top plan view of an embodiment of a transfer tray.
Figure 7B:
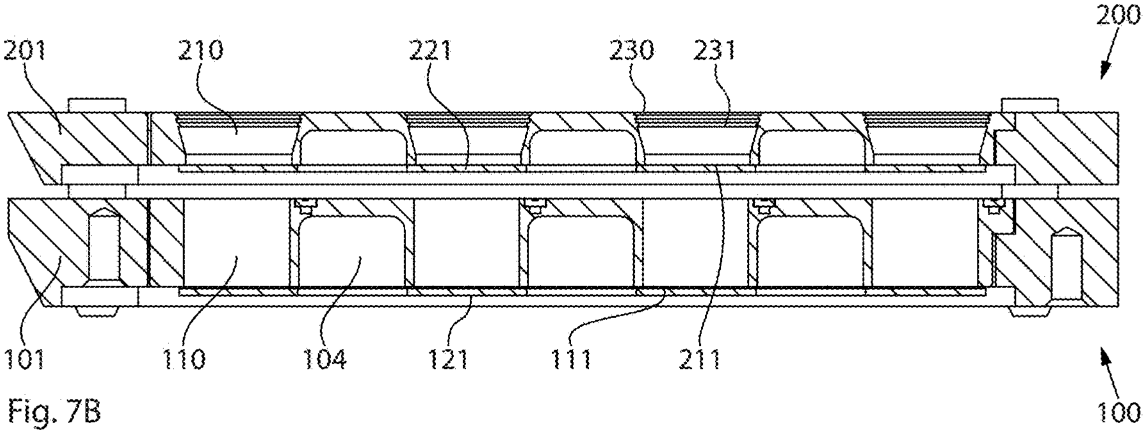

FIG. 7A provides a top view of the transfer tray 200. With each receptacle 210, two circular display members 230, 231 are provided with which a filling template may be displayed. Each receptacle 210 may also be allocated only one circular display member 230, 231 or more than two circular display members 230, 231. The circular display members 230, 231 may also be embodied as continuous light rings, wherein different illumination scenarios may indicate a different number of drug portions 10. The display members 230, 231 may represent illumination scenarios in a digital or analog manner. Thus, the outer ring may stand for one portion, the inner ring may stand for two portions, and both rings may stand for three portions (e.g., digital). The number may be color-coded (e.g., analog). FIG. 7B provides a sectional view of a combination of transport tray 100/transfer tray 200.

Figure 7C:
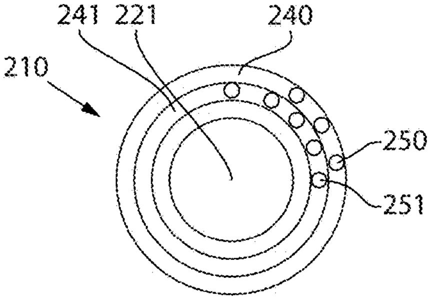

FIG. 7C illustrates a receptacle 210 having multiple display members 250, 251 arranged on each of two annular surfaces 240, 241 and that are coaxial with the center point of the receptacle 210. Thus, even complicated filling templates may be displayed. This is especially helpful when filling does not involve just one drug type, but instead the receptacles 210 are filled successively with different drug portions 10 and types of drugs. For example, the display members 250 of the outer annular surface 240 may indicate drug type 1, and the display members 251 of the inner annular surface 241 may indicate drug type 2.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

Many of the above-described features and applications may be implemented as software processes that are specified as a set of instructions recorded on a computer readable storage medium (alternatively referred to as computer-readable media/medium, machine-readable media/medium, or machine-readable storage media/medium). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media/medium, non-transitory computer readable storage media/medium, or non-transitory computer readable storage media/medium.

In one or more implementations, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A filling station comprising:

a transfer tray having a plurality of filling receptacles and a closing device arranged under the filling receptacles, the closing device configured to open and close bottom openings in the filling receptacles;

an optical detection device configured to generate one or more images of filling receptacles having drug portions arranged therein; and a control device coupled to the optical detection device, the control device configured to:

cause display of a filling template of which filling receptacles are to be filled with one or more drug portions;

compare an actual filling of the filling receptacles based on the one or more images of the filling receptacles generated by the optical detection device to a target filling;

determine that no deviation exists between the actual filling and the target filling; and open the closing device for transferring the drug portions from the transfer tray to a transport tray.

2. The filling station of claim 1, wherein the transport tray comprises a plurality of transfer receptacles arranged below the transfer tray.

3. The filling station of claim 2, wherein the arrangement of the filling receptacles in the transfer tray corresponds to the arrangement of the transfer receptacles in the transport tray.

4. The filling station of claim 2, wherein at least one transfer receptacle comprises a display member.

5. The filling station of claim 1, further comprising a projector device configured to project the filling templates onto the transfer tray.

6. The filling station of claim 1, wherein at least one filling receptacle comprises a wall that is tapered inward.

7. The filling station of claim 1, wherein at least one filling receptacle comprises a wall that is perpendicular to the closing device.

8. The filling station of claim 1, wherein the closing device comprises a closing plate coupled to a handle for manual opening of the closing device.

9. The filling station of claim 1, wherein the closing device comprises a closing plate coupled to a drive for automated opening of the closing device.

10. The filling station of claim 1, further comprising a projector device configured to project the filling template onto the transfer tray.

11. The filling station of claim 1, wherein the filling template includes all filling receptacles to be filled and all drug types to be filled.

12. The filling station of claim 1, further comprising a display device coupled with the control device, wherein the display device is configured to display a target deviation.

13. The filling station of claim 1, further comprising a display device coupled with the control device, wherein the display device is configured to display the filling template.

14. The filling station of claim 1, further comprising a plurality of display members allocated to the filling receptacles.

15. The filling station of claim 1, further comprising a sensor associated with the filling receptacles, the sensor configured to determine a number of drug portions disposed per filling receptacle.

16. A system comprising:

a transfer tray;

a transport tray;

a control device; and an optical detection device, wherein the system is configured to:

generate a filling template based on a target filling of filling receptacles in the transfer tray, the filling template indicating which of the filling receptacles are to be filled with one or more drug portions;

generate, via the optical detection device, images of the filling receptacles, wherein an image of a filling receptacle shows drug portions arranged therein;

determine an actual filling of the filling receptacles based on the images;

identify a level of deviation between the actual filling of the filling receptacles and the one or more target fillings; and open a closing device of the transfer tray to transfer the drug portions to the transport tray based on the level of deviation.

17. The system of claim 16, wherein the transport tray comprises a plurality of transfer receptacles arranged below the transfer tray, wherein the arrangement of the filling receptacles in the transfer tray corresponds to the arrangement of the transfer receptacles in the transport tray.

18. The system of claim 16, further comprising displaying the filling template on a display device.

19. The system of claim 16, further comprising determine, by a sensor, a number of drug portions disposed per filling receptacle.

20. A method of operating a filling station, the method comprising:

generating, by a control device, a filling template based on a target filling of filling receptacles in a transfer tray, the filling template indicating which of the filling receptacles are to be filled with one or more drug portions;

generating, by an optical detection device, images of the filling receptacles, wherein an image of a filling receptacle shows drug portions arranged therein;

determining, by the control device, an actual filling of the filling receptacles based on the images;

identifying, by the control device, a level of deviation between the actual filling of the filling receptacles and the one or more target fillings; and opening a closing device of the transfer tray to transfer the drug portions to a transport tray based on the level of deviation.

* * * * *